UNITED STATES PATENT OFFICE.

MAX STERN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

STABILIZED UREA-HYDROGEN-PEROXID COMPOUND.

1,071,186.     Specification of Letters Patent.     Patented Aug. 26, 1913.

No Drawing.     Application filed April 16, 1912. Serial No. 691,165.

*To all whom it may concern:*

Be it known that I, MAX STERN, doctor of philosophy, chemist, citizen of the German Empire, residing at Elberfeld, Germany, have invented new and useful Improvements in Stabilized Urea - Hydrogen-Peroxid Compound, of which the following is a specification.

In my application Serial No. 644527, filed August 17, 1911, a product is described which is obtained by treating carbamid with hydrogen peroxid at a temperature below that at which the resulting product decomposes and at which the formation of objectionable byproducts takes place. A stable product, containing substantially the theoretical amount of $H_2O_2$ required by the formula $$NH_2-CO-NH_2.H_2O_2,$$

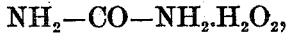

is thus obtained. I have now found that the stability of this product can be highly increased by adding to this product either after or during its formation starch or a starch like substance e. g. an amylose, dextrin, glycogen, etc. The products thus treated can be used in the tropics without danger of decomposition.

In order to illustrate the new process more fully the following example is given, the parts being by weight:—10 parts of the product obtained from hydrogen peroxid and carbamid are dissolved in 4.5 parts of water at 50° C. 0.5 parts of starch treated previously with alkali are added and the product is brought to crystallization by cooling, filtered off and dried. 10 parts of the product obtained from hydrogen peroxid and carbamid can e. g. be mixed with 0.5 parts of wheat starch and pressed to tabloids.

I claim:—

1. The herein described new pharmaceutical product comprising the double compound of hydrogen peroxid and urea having most probably the formula $$NH_2-CO-NH_2.H_2O_2$$

and starch which is a valuable pharmaceutical compound liberating hydrogen peroxid when mixed with water, substantially as described.

2. The herein described new pharmaceutical product comprising the double compound of hydrogen peroxid and urea having most probably the formula $$NH_2-CO-NH_2.H_2O_2$$

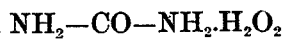

and an amylose which is a valuable pharmaceutical compound liberating hydrogen peroxid when mixed with water, substantially as described.

In testimony whereof I have hereunto set my hand in the presence of two subscribing witnesses.

MAX STERN. [L. S.]

Witnesses:
   HELEN NUFER,
   ALBERT NUFER.